June 12, 1945.   C. E. LAUE   2,377,891
COMPRESSION FITTING
Filed Sept. 5, 1942

INVENTOR.
Charles Ernest Laue
BY Walter J. Schlegel, Jr. Atty.

Patented June 12, 1945

2,377,891

UNITED STATES PATENT OFFICE 2,377,891

COMPRESSION FITTING

Charles Ernest Laue, Chicago, Ill.

Application September 5, 1942, Serial No. 457,385

3 Claims. (Cl. 285—166)

My invention relates to a tube coupling or fitting, and more particularly to a compression fitting in which seating means associated with a tube is compressed by a nut member into engagement with a body member in order to seal the fitting.

In order that a fitting of the above described type may be completely satisfactory, a number of features must be present, and one of these features is that the fitting must be capable of assembly and disassembly without transmitting torque forces to the tube from the nut member as it engages and disengages the body member in the usual manner.

It is therefore an object of this invention to prevent the transmission of torque forces in the manner above described by providing the tube with a metallic sleeve which seats against the body member and which slidably engages the nut member at all times in a plane substantially perpendicular to the axis of the fitting. It will be readily understood that the nut member, if it engaged the collar at some other plane might tend to effect a wedge engagement therewith which might result in the transmission of torque from the nut member to the collar and thence to the tube.

Another essential feature of a satisfactory compression fitting is capabilty of repeated assembly and disassembly of the fitting without permitting leakage, and I achieve this feature by forming and arranging a lead collar between the tube and the sleeve, a portion of the lead being extruded from between the sleeve and the tube into seating engagement with the body member as the nut member compresses the sleeve against the body member and thereby contracts a portion of the sleeve about the lead collar.

It will be understood that the lead being a readily deformable material will form an excellent and renewable seat each time the coupling is assembled and as the lead is very gradually worn away more will be extruded by the continued contraction of the sleeve, so that the lead is automatically fed out from between the tube and the sleeve as needed. It will be apparent that any comparatively soft and fluid impervious material might be substituted for the lead; however, the ability of the lead to withstand corrosive action of certain materials which may pass through the tube makes the lead a particularly suitable substance for this purpose.

In the drawing, Figure 1 is a sectional view of the coupling in a plane bisecting the axis thereof, the tube and sleeve assembly being shown in elevation;

Figure 1:
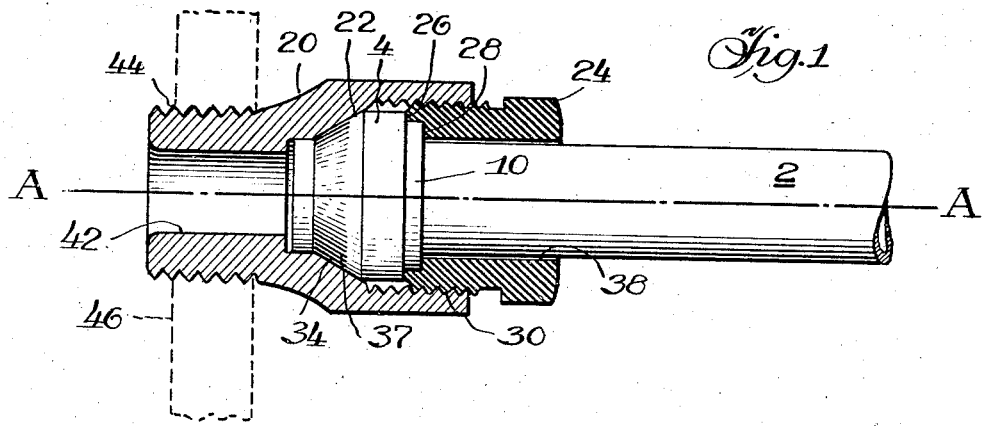
Figure 2:
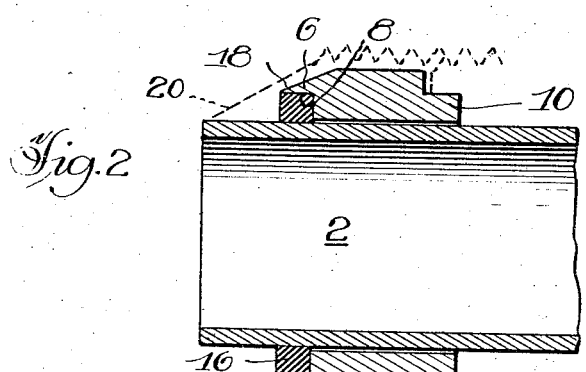
Figures 2 and 3 are enlarged sectional views in the plane of Figure 1 and showing respectively the tube and sleeve assembly before and after application to the body member.
Figure 3:
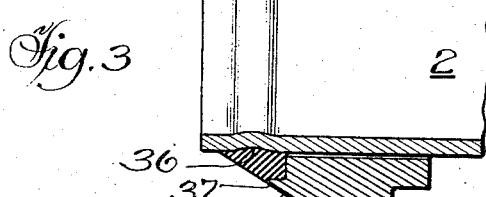

Describing my invention in detail and referring first to the modifications shown in Figures 1 to 4, inclusive, the tube 2 may be a standard tube of any suitable material such as brass, aluminum, or plastic, and a sleeve 4 may be positioned on said tube adjacent one end thereof, said sleeve being formed of any suitable material such as brass or aluminum and comprising at one end thereof an annular flange 6 (Figures 3 to 4) defining an annular recess 8, and said sleeve 4 may comprise at the opposite end thereof an annular flange 10 defining the shoulder 12 (Figures 2 and 3).

A readily deformable collar 16 of lead or other suitable material having the characteristic of fluidity may be interposed between the flange 6 of the sleeve 4 and the tube 2, said collar being accommodated within the recess 8 and affording a reservoir of metal for a purpose hereinafter more fully described.

Figure 4:
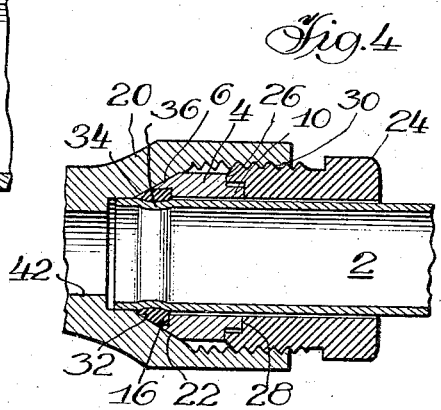
Figure 4 is a sectional view of my coupling taken in the same plane as Figures 1 to 3, inclusive.

The sleeve 4 and the flange 6 thereon are provided with a tapered surface 18 adapted to seat against the body member generally designated 20, as at 22 (Figures 1 and 4).

A nut member generally designated 24 engages the annular shoulder 12 and the flange 10 at 26 and 28 respectively, at surfaces lying perpendicular to the axis of the assembly, indicated at A—A, Figure 1, said nut member having threaded engagement at 30 with the body member 20 in the usual manner. It will be apparent from a consideration of Figure 2, showing the tube 2 and the associated sleeve 4 and the collar 16 before assembly with Figures 3 and 4, showing the structure after assembly, that as the nut member 24 is threaded into the body member 20, the flange 6 is contracted about the collar 16, whereby the lead is extruded at 32 and is afforded a seating engagement at 34 (Figures 1 and 4) with the body member 20, said collar 16 also being contracted about the tube 2 to form a cannelure at 36, thus interlocking the tube, the sleeve 4 and the collar 16, whereby they may thereafter be readily handled as a unit in the assembly and disassembly of the fitting.

If desired, it will be understood that the tube 2 may be knurled in order to afford a more effective engagement with the lead collar 16.

It will be understood that the lead constituting the collar 16 is gradually extruded from between the flange 6 and the tube 2, and that the conditions shown in Figures 1, 3 and 4 will prevail only after the coupling has been assembled several times. However, the flange 6 affords a seat against the body member 20 as at 22 until the lead is extruded into seating engagement at 34 with the body member. In this connection it may be noted that in actual practice after the coupling has been assembled several times a thin layer of the lead is smeared over the tapered surface of the flange 6 as indicated at 37 (Figures 1 and 3).

It will be further understood that if desired the sleeve 4 and the lead collar 16 may be initially formed substantially as shown in Figure 3 with the collar presenting a tapered surface for engagement as at 34 with the body member. After the collar and the sleeve assume the form shown in Figure 3, however, whether initially assembled in that form or compressed into said form by the nut member 24 in the manner above described it will be understood that the tapered surface of the lead collar which engages the body at 34 will be deformed into a new seat each time the coupling is assembled.

It will be apparent from a consideration of Figures 1 to 4 that although the tube 2 in these modifications may be slightly spaced from the nut member 24 and the sleeve 16, the space between said sleeve and the tube is insufficient to permit the lead to flow therethrough.

Thus it will be understood that I have provided a fitting which may be readily assembled and disassembled without transmitting torque forces to the tube, and which may be readily assembled and disassembled repeatedly without causing leakage, inasmuch as the readily deformable lead collar utilized in my invention forms a new seat each time it is urged into engagement with the body member by means of the nut member.

The body member 20 is provided with a passage 42 of usual form and said body member in the modification shown is threaded at 44, Figure 1, for engagement with a wall 46 of a reservoir or any other desired structure, fragmentarily indicated in Figure 1, but it will be understood that the body member 20 may be formed with one or more additional seats for engagement with one or more additional tubes in order to afford a coupling between several tubes in a manner well known to those skilled in the art.

As shown, the nut member and the body member are formed respectively as male and female members, but it will be apparent that these members might be formed with the nut member as a female member and the body member as a male member without departing from the scope of this invention.

Figure 5:
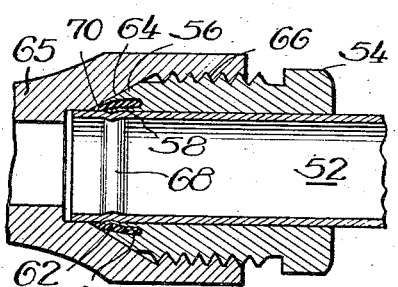
Figure 5 is a sectional view taken in the same plane as Figures 1 to 4, inclusive, but showing a modified form of my coupling.
Figures 6, 7:
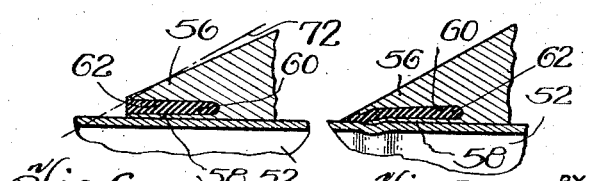
Figures 6 and 7 are enlarged fragmentary sectional views showing respectively the conditions prevailing before and after the assembly of the coupling shown in Figure 5.

Another modification of my invention is shown in Figures 5 to 7 inclusive, in which the tube 52 is provided with a nut member 54 sleeved thereover, said nut member comprising the spaced inner and outer annular flanges 56 and 58 defining therebetween the annular recess 60 filled with lead 62 or other readily deformable substance, the outer flange 56 being provided with a tapered surface seated at 64, Figure 5, against a complementary surface on the body member 65, said body member having threaded engagement at 66 with the nut member 54.

Figures 6 and 7 are fragmentary sectional views showing respectively the conditions prevailing before and after the first few assemblies of this modification of my coupling, and it will be apparent that the flanges 56 and 58 are gradually contracted about the tube 52 as the nut member is urged into engagement with the body member 65, the outer flange 56 being contracted to a greater extent than the inner flange 58, whereby the lead 62 is extruded from the recess 60, the lead together with the flange 58 being contracted about the tube 52 to form the canneluere 68 (Figure 5), thus restraining the tube against longitudinal movement with respect to the nut member 54.

It will be noted from a consideration of Figure 5 that the lead 62 is urged into seating engagement at 70 with the body member 65, thus forming a readily deformable and renewable seat against said body member each time the coupling is assembled. The degree of contraction of the outer annular flange may be seen from a comparison of Figures 6 and 7, in which the angle of taper of the seat of the body member 65 is indicated at 72 (Figure 6) and it may be noted in Figure 7, showing the contour of the nut member after several assemblies with the body member, that the flange 56 has been deformed to conform to the taper of the seat 72, said deformation serving to extrude the lead 62 in the manner heretofore described.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a tube coupling, a tube, a collar thereon, said collar being formed of a material having the characteristic of fluidity, a sleeve on said tube having spaced flanges substantially completely confining the inner and outer perimeters of said collar, the outer flange having a tapered seating surface, a body having a tapered seat, and means for urging said surface against said seat whereby said flanges and said collar are contracted about said tube and a portion of said material is extruded from between said flanges into seating engagement with said seat.

2. As a new article of manufacture, a composite coupling element for a tube, comprising a sleeve including an annular radially contractible flange on one end thereof defining a recess, and a relatively soft metallic collar completely confined from end to end thereof within said recess in abutment with the inner perimeter of said flange and adapted, when said sleeve is contracted, to form a seat about the tube.

3. As a new article of manufacture, a threaded sleeve having on one end thereof spaced inner and outer, annular, radially contractible flanges defining a recess therebetween, and a collar of relatively soft, extrudable material confined within said recess.

CHARLES ERNEST LAUE.